A. WILLIAMS & S. M. KILBRIDE.
JOURNAL BOX.
APPLICATION FILED APR. 24, 1915.
1,173,472.
Patented Feb. 29, 1916.
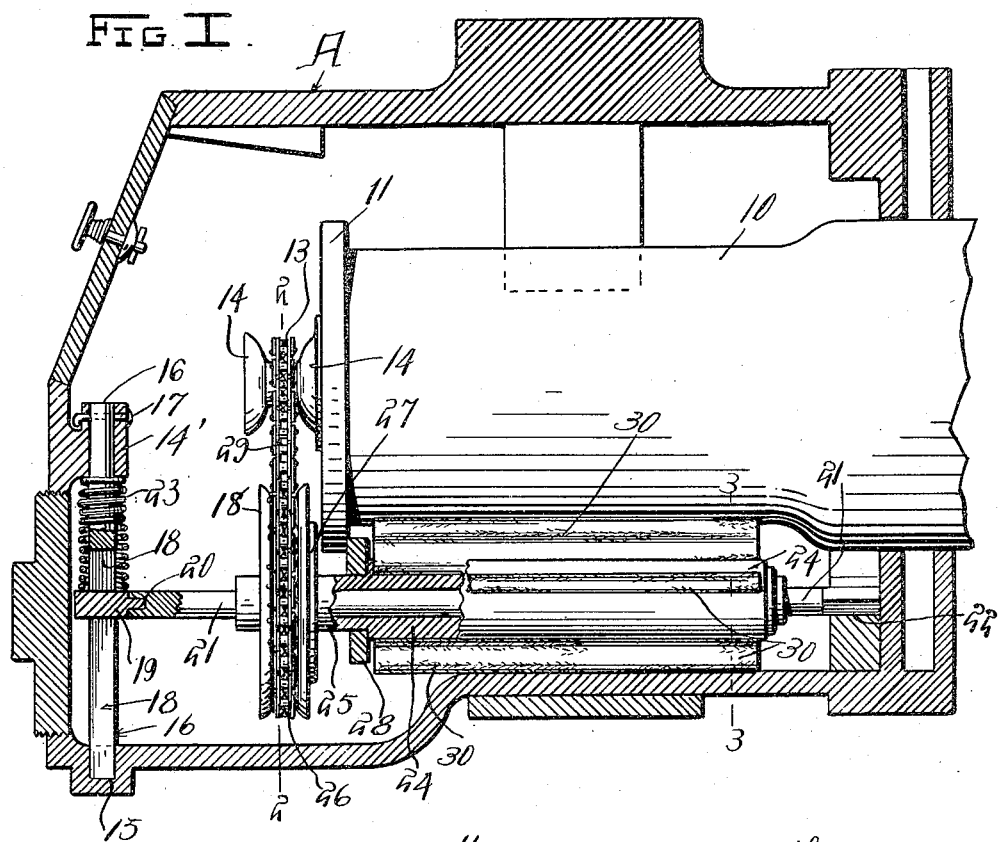
FIG. 1.
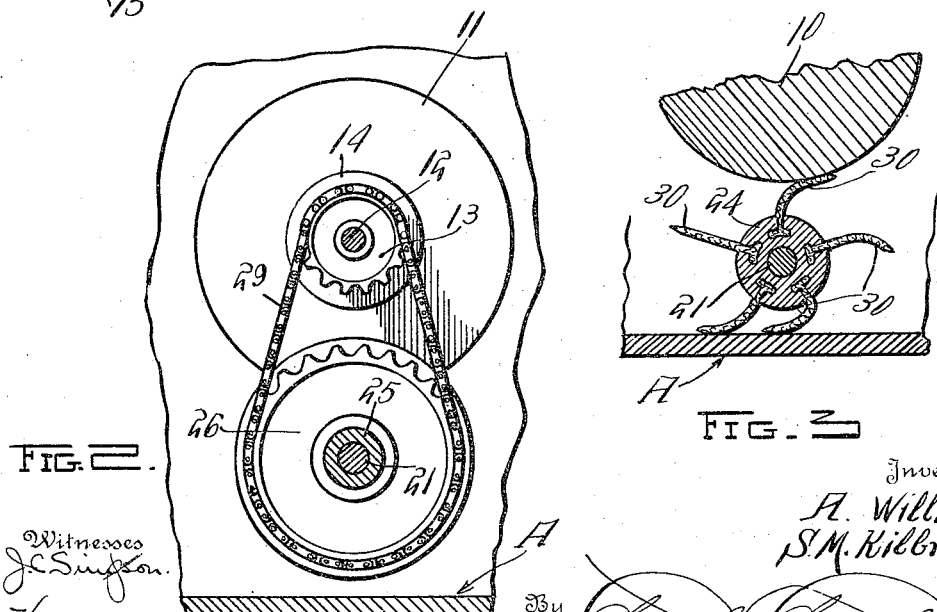
FIG. 2.
FIG. 3.
Witnesses
Inventors
A. Williams.
S. M. Kilbride.
By
Attorneys

UNITED STATES PATENT OFFICE.

ALBERT WILLIAMS AND SAMUEL M. KILBRIDE, OF LOGAN, MONTANA.

JOURNAL-BOX.

1,173,472. Specification of Letters Patent. Patented Feb. 29, 1916.

Application filed April 24, 1915. Serial No. 23,657.

*To all whom it may concern:*

Be it known that we, ALBERT WILLIAMS and SAMUEL M. KILBRIDE, citizens of the United States, residing at Logan, in the county of Gallatin, State of Montana, have invented certain new and useful Improvements in Journal-Boxes; and we do hereby declare the following to be a full, clear, and exact description of the invention, such as will enable others skilled in the art to which it appertains to make and use the same.

This invention relates to journal boxes and more particularly to lubricating devices therefor.

The object of the invention resides in the provision of a novel lubricating device for journal boxes which will efficiently maintain the lubrication of the journal of the axle and which will not be affected in the event of the journal box becoming distorted within certain limits.

With the above and other objects in view the invention consists in the details of construction and in the arrangement and combination of parts to be hereinafter more fully described and particularly pointed out in the appended claims.

In describing the invention in detail reference will be had to the accompanying drawings wherein like characters of reference denote corresponding parts in the several views, and in which—

Figure 1 is a vertical section through a journal box having the improved lubricator associated therewith; Fig. 2, a section on the line 2—2 of Fig. 1; and Fig. 3, a section on the line 3—3 of Fig. 1.

Referring to the drawings A indicates generally a journal box suitably shaped to provide the necessary shape for the installation of the improved lubricator. An axle journal 10 is shown operatively associated with the box and is provided on its outer end with a collar 11. Fixed to the journal 10 and projecting longitudinally from its outer end is a stub shaft 12 which has fixed thereon a sprocket wheel 13 and guard members 14, the latter being disposed on either side of the wheel 13 and serving to prevent disengagement of a sprocket chain from the wheel 13 as will be obvious. Formed on the inner side of the outer end of the journal box A is an eye member 14' which alines with a recess or socket 15 formed in the bottom of the journal box A. Engaged through the eye member 14 and seating in the socket 15 is a bolt 16, the same being secured in place by a breakable bolt 17 passed through the eye member 14 and the bolt 16. This bolt 16 is provided with a longitudinal slot 18 in which is slidably mounted a bearing 19 having one end reduced as at 20 and engaged in the adjacent end of a shaft 21, the other end of said shaft being mounted in the inner end of the journal box A as at 22. A spring 23 encircles the bolt 16 and has one end bearing against the eye member 14 and its other end against the bearing 19, said spring constantly tending to move the adjacent end of the shaft 21 toward the bottom of the journal box A. It will be noted that the shaft 21 is non-rotatable. A cylinder 24 is rotatably mounted on the shaft 21 and includes a reduced terminal portion 25 upon which is fixed a sprocket wheel 26 and spaced guide disks 27 and 28, the latter being disposed on opposite sides of the collar 11 and thereby serving to hold the cylinder 24 against longitudinal movement on the shaft 21. The sprocket wheel 26 is disposed in line with the sprocket wheel 13 and a sprocket chain 29 travels on said sprocket wheels so that when the journal 10 is rotated the cylinder 24 will also be rotated. Suitably mounted on the cylinder 24 is a plurality of radially disposed wipers 30 which engage the periphery of the journal 10 during the rotation of the cylinder 24 and deposit the oil thereon. Inasmuch as the outer end of the shaft 21 can move up and down it will be obvious that the box A can be distorted or become untrue within certain limits without in any way affecting the efficiency of the lubricator.

What is claimed is:—

The combination with a journal box and an axle journal operatively associated therewith, of a vertical member mounted in the journal box and having a longitudinal slot therein, a non-rotatable shaft having one end slidably engaged in said slot and its other end engaged in the wall of the journal box, a spring encircling the vertical member and constantly tending to move the adjacent end of the shaft away from the journal, a cylinder rotatably mounted on said shaft, wipers carried by said cylinder and adapted to engage the periphery of the journal during rotation of the cylinder, a sprocket wheel fixed on the cylinder, a sprocket wheel fixed on the journal, and a sprocket chain traveling on said sprocket wheel.

In testimony whereof, we affix our signatures, in the presence of two witnesses.

ALBERT WILLIAMS.
SAMUEL M. KILBRIDE.

Witnesses:
JOSEPH A. MCQUILLAN,
JOHN T. STROUD.

Copies of this patent may be obtained for five cents each, by addressing the "Commissioner of Patents, Washington, D. C."